(No Model.) 2 Sheets—Sheet 1.
J. PRADE.
NUT SHELLER.
No. 542,104. Patented July 2, 1895.
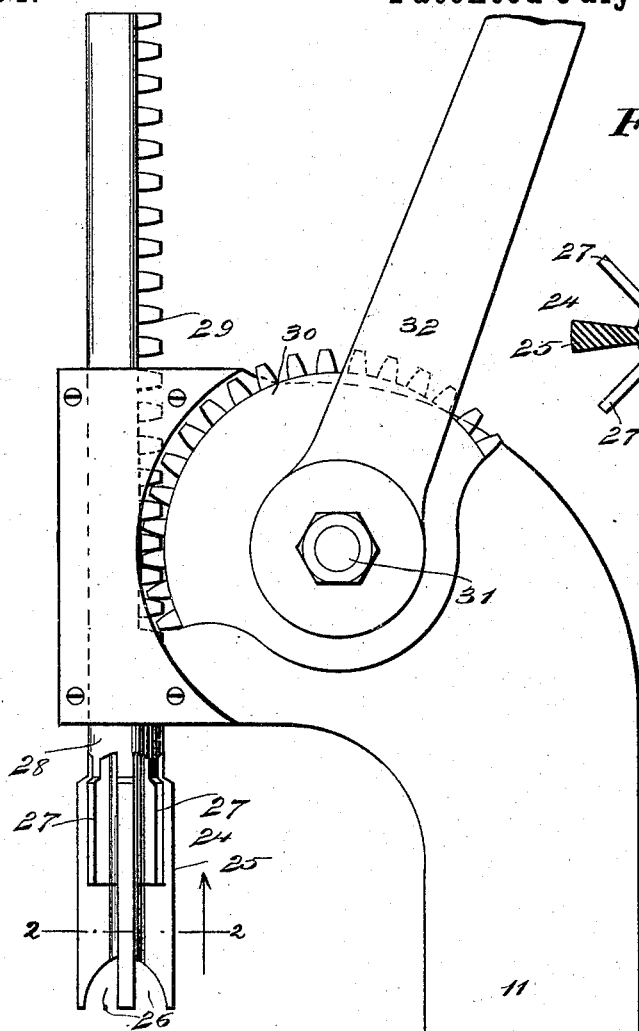
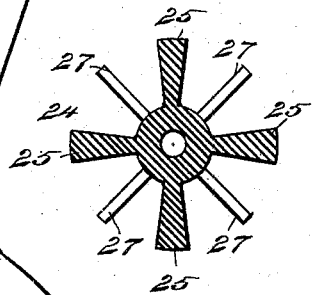
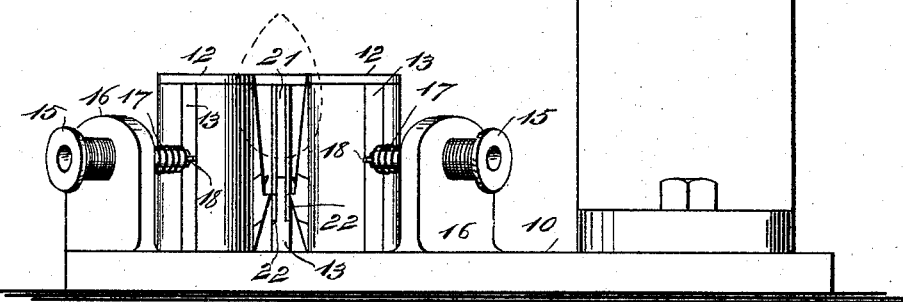
WITNESSES:
Joshua Bergstrom
W. B. Hutchinson
INVENTOR
J. Prade
BY
Munn & Co.
ATTORNEYS.

(No Model.) 2 Sheets—Sheet 2.

J. PRADE.
NUT SHELLER.

No. 542,104. Patented July 2, 1895.

WITNESSES:
Joshua Bergstrom
N. B. Hutchinson

INVENTOR
J. Prade
BY
Munn & Co.
ATTORNEYS.

UNITED STATES PATENT OFFICE.

JULIEN PRADE, OF WACO, TEXAS.

NUT-SHELLER.

SPECIFICATION forming part of Letters Patent No. 542,104, dated July 2, 1895.

Application filed June 16, 1894. Serial No. 514,784. (No model.)

*To all whom it may concern:*

Be it known that I, JULIEN PRADE, of Waco, in the county of McLennan and State of Texas, have invented a new and Improved Nut-Sheller, of which the following is a full, clear, and exact description.

My invention relates to improvements in nut-shellers, and the object of my invention is to produce a simple machine which is well adapted for shelling pecan-nuts, although it may be used for shelling other varieties of nuts; to produce a machine having an adjustable nut-holder which adapts itself to the varying sizes of nuts, and, further, to arrange a reciprocating plunger which is adapted to cut the shell from the nut, and which has also means for cleaning out the nut-holder and shelling-knives, so that the machine is sure to work well every time.

To these ends my invention consists of certain features of construction and combinations of parts, which will be hereinafter described and claimed.

Reference is to be had to the accompanying drawings, forming a part of this specification, in which similar figures of reference indicate corresponding parts in all the views.

Figure 3:
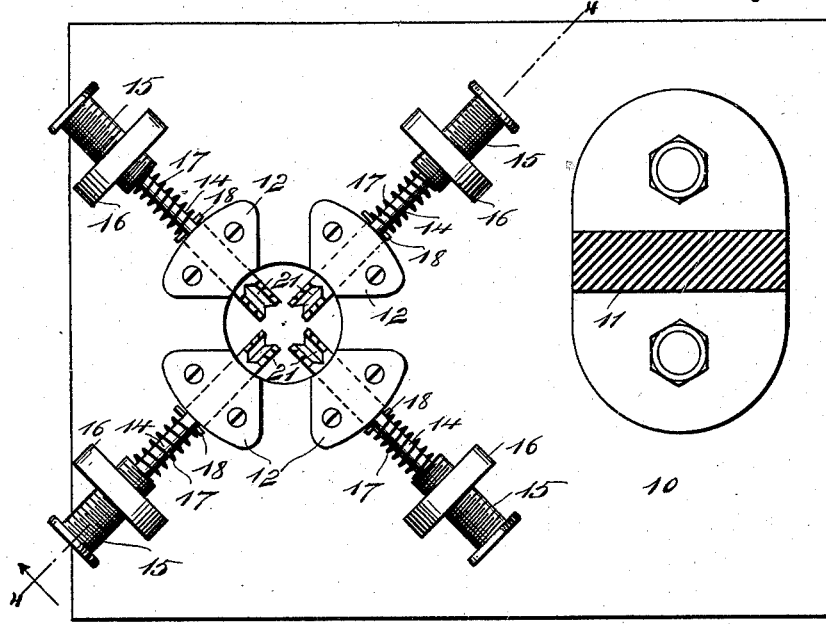
Figure 4:
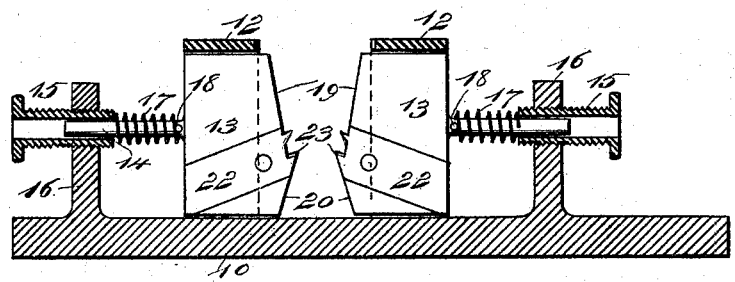
Figures 5, 6:
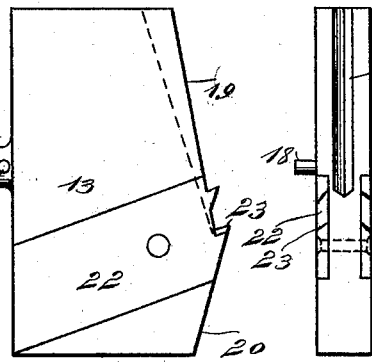
Figure 7:
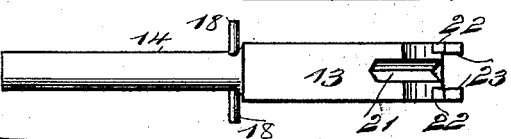

Figure 1 is a side elevation of the machine embodying my invention. Fig. 2 is a cross-section, on the line 2 2 of Fig. 1, of the plunger. Fig. 3 is a sectional plan of the machine. Fig. 4 is a vertical section on the line 4 4 of Fig. 3. Fig. 5 is a detail side elevation of one of the knife-plates with the knife secured thereto. Fig. 6 is a front elevation of one of the knife-plates, and Fig. 7 is a plan view of the same.

The machine is provided with a suitable base-plate 10, to which is fastened a standard 11, carrying the plunger and the mechanism for working it, which will be hereinafter described, and the base-plate also carries the nut-holder, which has a series of circumferentially-arranged guides 12, which are fastened to the base-plate and which support the sliding knife-plates 13, these being arranged in the guides, and there are preferably four of them, although a greater or less number may be used, the plates forming a holder in which a nut may rest, as shown by dotted lines in Fig. 1. Each plate 13 is provided with a shank 14, which slides in the hollow tension-screw 15, fitted in a lug 16, secured to the base-plate 10, and on each shank 14 is a spiral spring 17, which presses the knife-plate inward, the movement of the plate being limited by a cross-pin 18 in the shank 14, which strikes against the back of a guide 12.

The front edges of the knife-plates 13 are inclined, as shown at 19 in Fig. 5, so as to make the plates narrower at the top than at the bottom, thus forming a sort of cone-socket in which a nut may rest, and the lower edges of the plates are inclined in the opposite direction, as shown at 20. Each knife-plate has also in its front edge and upper portion a longitudinal groove 21, which enables a nut to be more securely held, and the grooves also receive the radial blades of the plungers, as hereinafter described, so as to prevent the said blades from pushing back the knife-plates. Each knife-plate has countersunk in it, on opposite sides, knives 22, which are ground at their inner edges to form hooks 23, which are adapted to engage the shell of a nut and readily split the same.

The nut-holder, comprising the several knife-plates and their guides, is arranged vertically beneath the plunger 24, which has two sets of blades, the blades 25 being placed radially and having their lower ends inclined or curved on the inner sides, as shown at 26 in Fig. 1, so that they will fit snugly over the end of a nut, these blades being thicker at their outer than at their inner sides, as shown in Fig. 2, and the plunger has also radial blades 27, of a uniform thickness, which are placed midway between the blades 25 and are adapted to enter the grooves 21 of the knife-plates 13, and the grooves prevent them from crowding the plates apart.

The blades 25 are for the purpose of removing from the knives any fragments of nuts which may adhere to them, and, if desired, the blades 25 may be made as long as the blades 27 and of the same shape, so as to give a good bearing-surface to the plunger. The plunger is formed on the lower end of a shank 28, which slides in the upper bent end of the standard 11, this shank having teeth 29 thereon to engage the segmental rack 30, which is carried by a stud 31, journaled in the standard 11 and provided with a handle 32, by which the stud may be turned and the rack moved, so as to work the plunger up and down.

I do not confine my invention to this precise means of working the plunger, as it may be reciprocated in any convenient way, and it will also be understood that the radially-placed knife-plates may also be supported and guided in other ways without departing from the principle of my invention.

When a nut is to be shelled, it is simply dropped into the socket formed by the radial knife-plates 13 and the plunger is forced down, thus forcing the nut upon the knives 22, which split the shell, and if the nut is a large one the plates 13 yield against the tension of the springs 17, the tension of which may be adjusted by the screws 15.

Having thus described my invention, I claim as new and desire to secure by Letters Patent—

1. A nut sheller, comprising a holder formed of a plurality of radially yielding plates, knives carried by the said plates, and a plunger provided with radial blades engaging the said plates, substantially as and for the purpose set forth.

2. A nut sheller, comprising a holder formed of a series of radially yielding plates provided with grooves in their edges, knives carried by said plates, and a plunger provided with radial blades adapted to enter the grooves of the said plates, substantially as described.

3. A nut sheller, comprising a holder having radially arranged spring-pressed plates narrowed at their upper ends to form a socket between them and provided with longitudinal grooves, knives secured to the plates and projecting from inner edges thereof, and a plunger reciprocating opposite the socket of the holder, the plunger having a concave end and a series of radial blades, some of which register with the grooves of the knife plates, substantially as described.

4. The combination, of the circumferentially placed guides, the adjustable spring-pressed knife plates mounted to slide in the guides, the plates having beveled inner edges to form a socket between them, and each plate being also provided with a longitudinal groove, and the knives secured to the plates and projecting from their inner edges, of the reciprocating plunger having a concave end and a series of radial blades, some of which register with the grooves in the knife plates, substantially as described.

5. In a nut sheller, the combination with a base provided with a series of circumferentially arranged guides, and upwardly projecting lugs, of knife carrying plates fitted to slide in the guides, and provided with shanks, hollow tension screws in the said lugs and into which screws, the shanks of the said plates project, and springs encircling the shanks, substantially as described.

6. In a nut sheller, the combination with a series of radially yielding knife carrying plates arranged circumferentially, said plates having inclined front upper edges, which are grooved longitudinally, of a plunger provided with two sets of radial blades, one set having their lower ends curved on their inner sides to fit over a nut, and the other set adapted to enter the grooves of the knife plates, substantially as described.

JULIEN PRADE.

Witnesses:
 H. H. WYMAN,
 E. M. EWING.